Aug. 15, 1950
C. W. SKARSTROM
2,519,081
PROCESS AND APPARATUS FOR DETERMINING
RATE OF COMPOSITION CHANGE
Filed Jan. 7, 1949
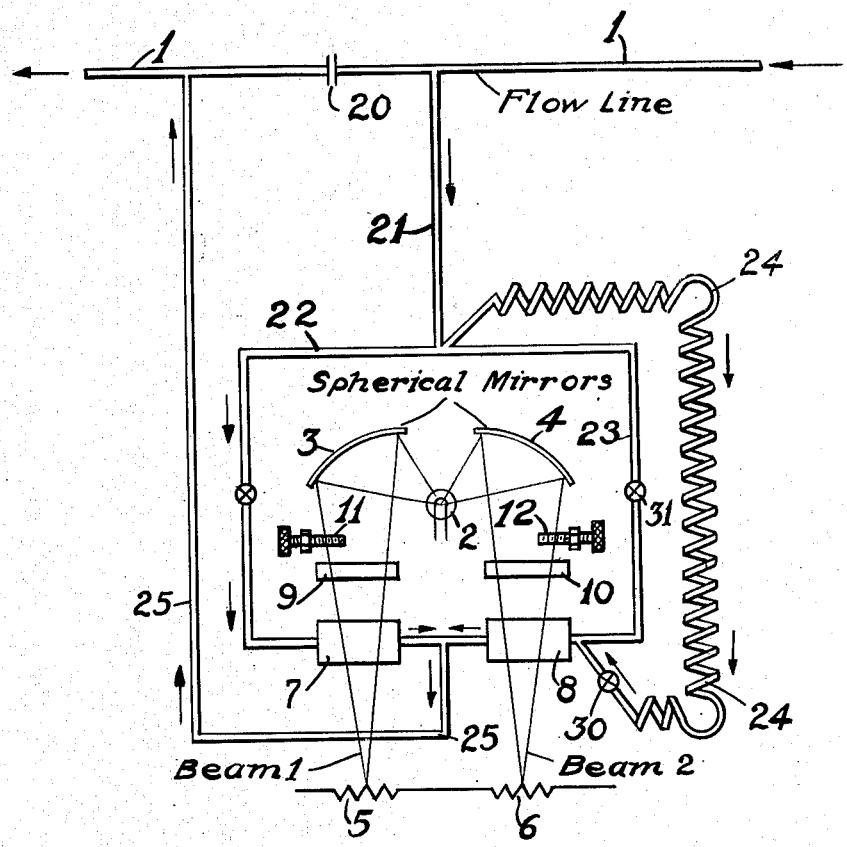
Charles W. Skarstrom Inventor
By W.O.T Hilman Attorney Patented Aug. 15, 1950

2,519,081

UNITED STATES PATENT OFFICE 2,519,081

PROCESS AND APPARATUS FOR DETERMINING RATE OF COMPOSITION CHANGE

Charles W. Skarstrom, Hazlet, N. J., assignor to Standard Oil Development Company, a corporation of Delaware Application January 7, 1949, Serial No. 69,673

5 Claims. (Cl. 250—218)

This invention relates to a new and novel process for determining the rate at which a particular composition changes. The invention further relates to an apparatus for practicing the process indicated.

In the chemical industry generally, it is frequently desirable or necessary to properly control a particular process to determine the composition of the feed stock or the products of the process. While the problem of analyzing feed streams to a process may often be relatively simple, particularly in the case where the process is a batch process, frequently the problem is more involved. For example in the case of continuous processes, it is frequently necessary to accurately determine the departure of the composition of process streams from some preassigned or desired value.

Important applications of this invention are envisioned in the fields of automatic plant process control where a knowledge of the changes in stream compositions would indicate how fast a process is deviating from or approaching a stable operating condition. For example, thermal hunting in close cut distillation towers or composition surges or oscillations in various continuous processes would be easily detected and controlled by proper application of the process of this invention. The cumulative effect of slow alteration of the process variables such as feed or purge flow rates, rates of heat input or cooling, etc., could be followed. In conjunction with automatic controls already known to the art, the device of this invention could be used as an anticipatory sensitive element based on rate of change of composition. So used this device would make possible more stable operation of many industrial processes. A further example of the application of this invention is for the determination of the proper cut point between different fluids flowing contiguously in a pipe line. It is therefore a principal object of this invention to provide an improved process and apparatus for rapidly and easily determining the rate of change of composition of process streams.

In accordance with this invention, two samples of fluid are withdrawn from a continuous fluid flow, in such a manner as to secure two samples corresponding to the composition of the continuous fluid flow at different times. In one embodiment of this invention, this is accomplished by splitting a sample withdrawal stream into two parts and passing the parts through conduits requiring different time intervals for the fluids to pass through the conduits, as by making one conduit substantially longer than the other. By comparing the composition of the two parts of the sample as they flow from the conduits comparative composition changes may be determined in a manner to give the rate of change of composition of the continuous fluid flow which was sampled.

One alternative method for obtaining two samples corresponding to the composition of the fluid flow in a line at different times is to withdraw two samples from displaced points in the fluid line. By conducting these samples along conduits of similar characteristics to a comparative analysis instrument, the difference in composition may be determined for a time interval equal to the time required for fluid to flow between the displaced sampling points in the line sampled.

It is therefore to be understood that in its broadest scope the process of this invention consists of three steps: First—two samples from a fluid flow line are obtained corresponding to the composition of the fluid passing a given point in the line at different times. One sample will correspond to the composition passing a point in the line at a time A while the other sample will correspond to the composition passing the same point in the line at a later time B. Secondly, the time displaced samples of step one are subjected to comparative analysis to determine the difference in composition, if any, between them. Thirdly by calibration of the apparatus used to conduct steps one and two, or by computations employing the interval of time displacement of the samples, the rate of change of composition, if any, of the fluid in the flow line samples is determined.

The nature and objects of this invention may be better understood from a description of a typical embodiment of the invention as illustrated in the single figure of the attached drawing. This drawing diagrammatically represents a suitable rate of change apparatus for determining the rate at which a composition flowing through a given line varies. Referring to this drawing, the numeral 1 designates a flow line. It is assumed that a fluid is being conducted through line 1 having a composition which may vary with time. For example, the fluid being conducted through line 1 may constitute a product stream from a chemical process of such a nature that it may be desirable to determine the rate at which the composition of this product stream is changing. Thus, in a continuous process operated with high velocity feed and product streams, to suitably control the process, it is important to know if the composition of the product is changing rapidly or slightly, and it is also important to know the direction of the change so as to permit adjustment of the feed stream composition or other operating variable such as pressure, temperature, etc. in a manner calculated to anticipate changes in the product stream. It is further assumed in this specific example of the invention that the material flowing through line 1 is a material which has a characteristic radiation energy absorption or transmission spectrum, so as to permit determination of the rate of change of the entire composition or a key component or group of components by the apparatus illustrated.

The analytical apparatus illustrated in the drawing consists of a dual beam radiation analytical apparatus. Two sample cells are positioned in each of two beams of radiant energy so that a difference in the compositions contained within the two sample cells will alter the nature of the radiation passing through the cells. Thus a source of light 2 for example, is positioned to transmit light against the mirrors 3 and 4 to form two beams of light directed toward radiation detectors 5 and 6. Positioned in each of the beams of light are sample cells 7 and 8, optionally used filter cells 9 and 10, and light "trimmers" 11 and 12. The light trimmers 11 and 12 may be called radiation intensity controls and may consist of suitable shutter arrangements or suitable opaque diaphragms provided with means to move them more or less into each beam of light. In this manner, it is possible to vary the amount of light passing the light trimmers so as to control the amount of light reaching the sample cells and the radiation detectors. The filter cells 9 and 10, as indicated, may or may not be used as desired. In many cases use of these filter cells is effective in improving the selectivity of the apparatus as will be described more fully. The sample cells 7 and 8, as illustrated, are provided with suitable entrances and exits so that fluid may be caused to flow through the cells. As described therefore, the analytical apparatus illustrated in the drawing constitutes a conventional type of a radiation analysis instrument. Successful operation of the apparatus depends upon proper utilization of auxiliary filter fluids in the filter cells 9 and 10, and upon proper setting of the radiation intensity controls 11 and 12. In addition it is necessary to choose a suitable radiation source for application to a particular analysis. The source, for example, may constitute a source that emits X-rays, visible light, ultra violet light, infrared light, short radio waves or other radiation sources. By thus connecting the two radiation detectors of the instrument in opposition in a conventional bridge circuit, differences in the composition of the sample in the two sample cells can be readily detected.

A particular feature of this invention is the manner of sampling from a flow line to obtain two samples corresponding to the composition of fluid in the flow at different times. As shown, an orifice 20 is positioned in the flow line 1 so as to provide a pressure drop in the line. Consequently by positioning a sampling line 21 prior to the orifice and intersecting line 1, part or all of the fluid flow through line 1 may be bypassed through line 21. It is apparent that in place of the orifice 20 suitable valves or other means for obtaining a pressure drop in the line may be employed. Fluid withdrawn from line 1 is then conducted from line 21 to the sample cells 7 and 8 through line 22 and either line 23 or 24. Fluid passing through the sample cells is withdrawn from the cells to flow through line 25 and thence back to the line 1 on the low pressure side of the orifice 20. As diagrammatically illustrated in the drawing, line 24 providing a fluid pathway between line 21 and sample cell 8 is a relatively long line. The length of line 24 is selected to provide a desired passage of time for the flow of fluid through the line. Thus it may be desired to select the length of line 24 in conjunction with the rate of flow of liquid through the line so that it will require a given period of time such as two seconds for the fluid to flow through this line. It is apparent that fluid flowing through line 22 from line 21 to sample cell 7 will reach sample cell 7 at a period of time sooner than fluid can pass through line 24 to sample cell 8. By this means, it is thus possible to cause the fluid sample contained within sample cell 8 to represent the nature of the fluid in line 1, at a finite time interval later than the time corresponding to the composition of the sample in cell 7. Consequently, by detecting the difference in light transmitting or absorbing characteristics of the samples, it is possible to determine the rate at which the composition in line 1 is changing.

In order to more fully understand the apparatus illustrated, the manner in which the apparatus is utilized will briefly be indicated. During the initial adjustment of the apparatus of the single figure, valve 30 in line 24 is closed and valve 31 in line 23 is opened. Orifice 20 or a suitable valve in line 21 is adjusted so that a reasonable amount of fluid is withdrawn from line 1 to flow through line 21. This fluid is split into two streams passing through the similar lines 22 and 23 to the sample cells 7 and 8 respectively. From the sample cells, the fluid then returns to line 1. Since lines 22 and 23 are similar it is apparent that even though the composition of fluid in line 1 is changing, the samples of this fluid contained in sample cells 7 and 8 at any one time will be identical. Consequently it is possible to adjust the apparatus so that the amount of energy falling on the radiation detectors 5 and 6 is equal. In some cases it is necessary to operate the light trimmers 11 and 12 in obtaining an optical balance so that the radiation detectors are caused to receive the same amount of light even though the composition of line 1 is variable. It may further be necessary to adjust the medium contained in the filter cells 9 and 10 so that this balance can be achieved, and the apparatus thus be made selective to one or more key components of the entire fluid stream. In any case on proper operation of the instrument it is possible to balance the output of the radiation detectors so that this balance will not be disturbed by changes in the composition of line 1. When this has been achieved, valve 31 is closed and valve 30 is opened so that a portion of the fluid withdrawn from line 1 is caused to pass through the flow delay line 24. As described, by virtue of this arrangement, if the composition of the fluid in line 1 changes, the radiation detectors will be thrown out of balance and remain out of balance as long as the composition is changing. As soon as the composition ceases to change the detectors return to the balanced condition even though the fluid composition is different now than at the start. The signal produced by the detectors is proportional to the magnitude and direction of the rate of composition changes. By suitably calibrating the apparatus, using known rates of change of composition of the fluid in line 1, it is then possible to follow the rate of change of composition by recording the energy intensity unbalance of the radiation detectors.

As indicated, the basic concept of this invention may be modified in many ways. Thus in the application of this invention, the source of radiation used may provide X-rays, visible light, ultraviolet light, infra-red light or radio waves. Again it is possible to use a source emitting elementary particles such as electrons, alpha particles or high energy photons. It is further apparent that any suitable means may be used for detecting the unbalance of the detectors 5 and 6 employed in the process of this invention. For example, it is possible to connect the detectors in opposition so that no signal is given by the detectors when the compositions in sample cells 7 and 8 are the same and so that an electrical voltage is produced when the compositions are different. Consequently this voltage may be suitably amplified to operate a throttling valve or other control means. In this embodiment of the invention it is apparent that process control can be automatic and anticipatory.

What is claimed is:

1. Apparatus for determining rate of composition changes in a fluid flow line, consisting of a means for imposing a pressure drop on the said line, means for withdrawing fluid from the said line along two paths, one of said paths being adapted to delay the time in which fluid passing through it reaches the end of said path, sample cells connected to said paths, radiation means adapted to transmit radiation through the sample cells, and detecting means adapted to detect changes in radiation coming through the sample cells.

2. Apparatus for determining rate of composition change of a fluid flowing through a line comprising a source of two beams of radiation, a radiation intensity control, and at least one radiation transparent body and a radiation intensity detector positioned in each of said beams of radiation, and means for withdrawing fluid from the line and passing the fluid along two paths to the said transparent body in each of the said beams, said paths having different fluid transmittal time from a particular point of the said line to the said transparent bodies.

3. Process for determining the rate of composition change in a fluid flowing in a line consisting in withdrawing a sample of the fluid from said line, dividing said sample into a first and a second stream, passing said first stream through a first confined path to a first cell, passing said second stream through a second confined path to a second cell, maintaining said second stream in said second confined path for a longer period of time than said first stream is maintained in said first confined path and subjecting each of said cells to radiation whereby differences in the nature of radiation, passing through the cells, may be detected.

4. Process for determining the rate of change of composition of a fluid flowing through a line comprising the steps of continuously passing a first sample of the fluid through a first confined path to a first cell, passing a second sample of the fluid through a second confined path to a second cell, maintaining said second sample in said second confined path for a longer period of time than said first sample is maintained in said first confined path and comparatively analyzing each of said samples whereby the rate of change of composition may be determined.

5. The process for determining the rate of composition change in a fluid flowing in a line consisting in withdrawing a sample of the fluid from said line, dividing said sample into a first and a second stream, passing said first stream through a confined path to a first cell, passing said second stream at the same rate of flow as said first stream through a confined path longer than the confined path of the said first stream to a second cell and subjecting each of said cells to radiation whereby differences in the nature of radiation, passing through the cells, may be detected.

CHARLES W. SKARSTROM.

REFERENCES CITED

The following references are of record in the file of this patent:

UNITED STATES PATENTS

| Number | Name | Date |
|---|---|---|
| 1,919,858 | Pettingill | July 25, 1933 |
| 2,431,899 | Wolf et al. | Dec. 2, 1947 |
| 2,437,715 | Thorp et al. | Mar. 16, 1948 |